United States Patent [19]

Cortes et al.

[11] Patent Number: 5,646,462
[45] Date of Patent: Jul. 8, 1997

[54] DC VOLTAGE BYPASS POWER SYSTEM ARCHITECTURE

[75] Inventors: Timothy M. Cortes, Richardson, Tex.; Robert John Kakalec, Madison, N.J.; Keith C. Schmid, Dallas, Tex.

[73] Assignee: Lucent Technologies Inc., Murray Hill, N.J.

[21] Appl. No.: 510,833

[22] Filed: Aug. 3, 1995

[51] Int. Cl.$^6$ ........................................ H02M 1/084
[52] U.S. Cl. ................. 307/127; 307/66; 307/138; 324/524; 327/28; 335/78; 363/63
[58] Field of Search .................. 307/66, 44, 127, 307/138, 19, 21, 22, 23, 25, 26, 29, 32, 37; 361/82, 84; 257/546; 324/524; 327/28; 335/78; 363/63

[56] References Cited

U.S. PATENT DOCUMENTS

| | | | |
|---|---|---|---|
| 4,665,322 | 5/1987 | Eishima et al. | 307/66 |
| 4,751,398 | 6/1988 | Ertz, III | 307/66 |
| 5,210,685 | 5/1993 | Rosa | 363/109 |
| 5,418,403 | 5/1995 | Morell, III | 307/72 |
| 5,534,734 | 7/1996 | Pugh et al. | 307/38 |

*Primary Examiner*—William M. Shoop, Jr.
*Assistant Examiner*—Albert W. Paladini
*Attorney, Agent, or Firm*—Alfred G. Steinmetz

[57] ABSTRACT

A power plant system architecture includes a plurality of battery polarity switching circuits for providing uninterruptible power/voltage to a plurality of loads, each of which is powered by low frequency AC, and which is also powered by a DC voltage. DC voltage is substituted for the AC voltage applied to the load should the voltage polarity processing circuitry in the power plant fail.

10 Claims, 3 Drawing Sheets

DC VOLTAGE BYPASS POWER SYSTEM ARCHITECTURE

FIELD OF THE INVENTION

This invention relates to power systems and in particular to power systems having redundant powering of the load. It is particularly concerned with power systems having a plurality of low frequency inverters energized from an AC source that is rectified or a DC reserve energy system either of which can supply DC power to a load upon failure of one of the inverters. In one specific aspect it concerns systems whose load can accept both AC or DC voltage as an energizing source.

BACKGROUND OF THE INVENTION

AC line voltage supplied power systems with reserve power capability normally have an inverter energized by DC voltage from rectified AC voltage. Reserve energy, to operate the inverter, is supplied by a battery. Either DC voltage source energizes the primary inverters and a reserve inverter to generate a power signal with the desired waveform. Control circuitry is required to both control the AC voltage waveform generated by the inverter so that it is in synchronism, is substantially identical to the desired voltage and to substitute the reserve inverter AC voltage, for the desired voltage should there be a failure of either the inverter circuitry or of synchronizing circuitry.

SUMMARY OF THE INVENTION

According to the invention, a protected power plant system is provided as described in the appended claim 1.

A power plant system architecture includes a plurality of battery polarity switching circuits, synchronizing to one another, for providing uninterruptible power/voltage to a plurality of loads, each of which is powered by low frequency AC, and which is also able to be powered by a DC voltage. DC voltage is substituted for the AC voltage applied to the load should the low frequency inverter fail or the synchronizing circuitry fail.

Battery polarity switching (BPS) circuits are circuits that take a DC voltage input and invert it into a low frequency AC voltage. In some embodiments a BPS circuit appears to resemble a rectifier although it operates differently.

In an illustrative power system rectified AC voltage (e.g., DC voltage) is applied to low frequency battery polarity switching circuitry, which produces a low frequency AC voltage (1 Hz to 60 Hz, for example) that is applied to energize a load able to be powered by either a low frequency AC voltage or a DC voltage.

In one illustrative embodiment, a bank of batteries is connected to provide a reserve DC voltage at the inputs of all the BPS circuits. Should one of the BPS circuits fail, means is provided to effect a switch over to a redundant/reserve source of DC voltage. Connection of the redundant DC voltage source to the output is through a voltage sensitive switch that connects the reserve DC voltage (e.g. a battery) to the outputs of the BPS circuits at a voltage level slightly below the normal DC voltage supplied by the rectifiers. The BPS circuits are controlled to stop switching (i.e., inverting) and produce a DC voltage for the failure duration of another BPS circuit in the system. In this failure mode all of the BPS circuits power their associated loads with a DC voltage while the reserve DC voltage, through a bypass circuit, powers the load of the failed BPS circuit.

In a particular arrangement, a diode gate is provided to apply backup DC voltage to the output of all the BPS circuits whenever the output of at least one such BPS circuit has failed. The number of BPS circuit loads that the spare unit can power is limited only by the power rating of the spare unit and the total load.

The output of the operative battery polarity switching circuits will all supply the load with the rectified DC voltage and the DC bypass voltage will power the load of the failed unit. In one illustrative arrangement a diode gate is enabled to apply the DC bypass voltage to the output of all the battery polarity switching circuits whenever the output of at least one such circuit has failed.

DETAILED DESCRIPTION

Figure 1:
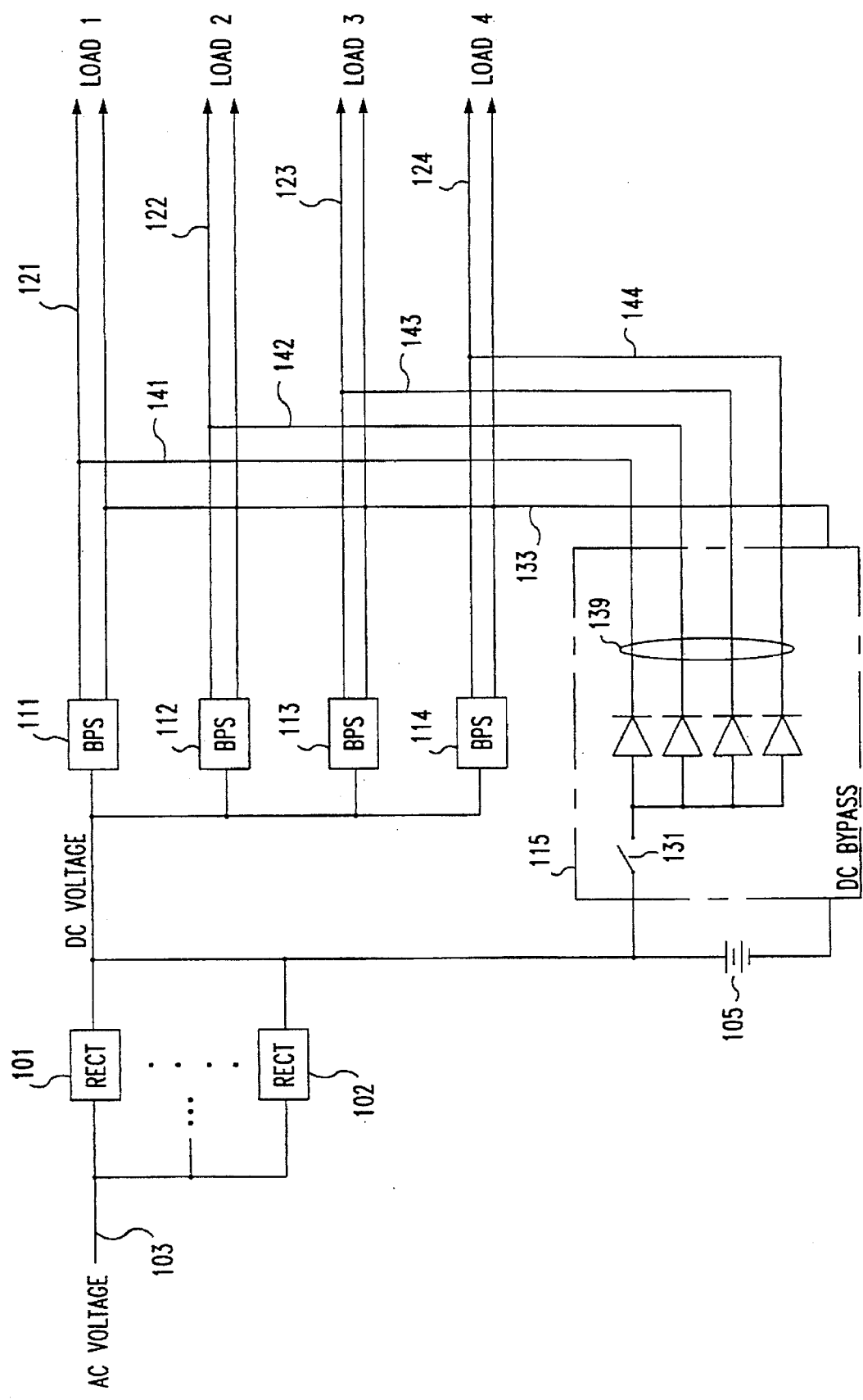
FIG. 1 is a block schematic of a protected power system architecture.
Figure 2A:
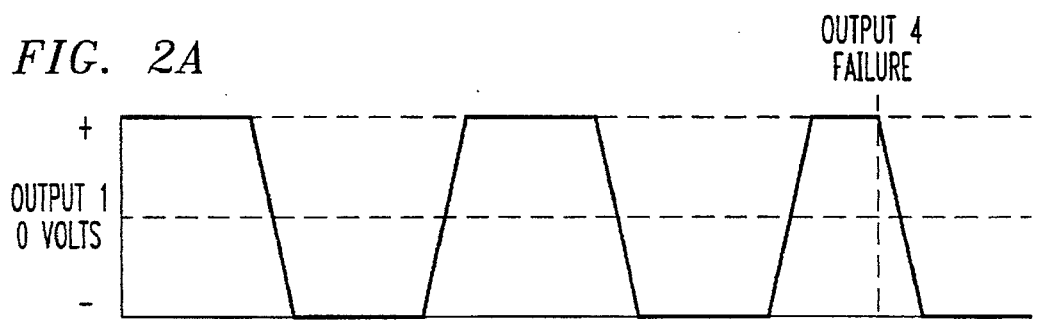
FIGS. 2A–2E show voltage wave forms useful in understating the operation of the power system of FIG. 1.
Figure 2B:
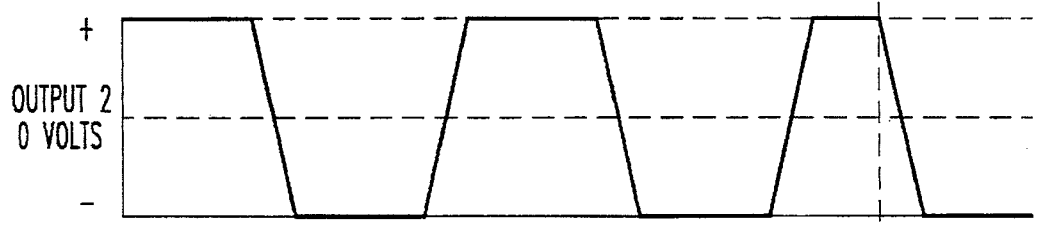
Figure 2C:
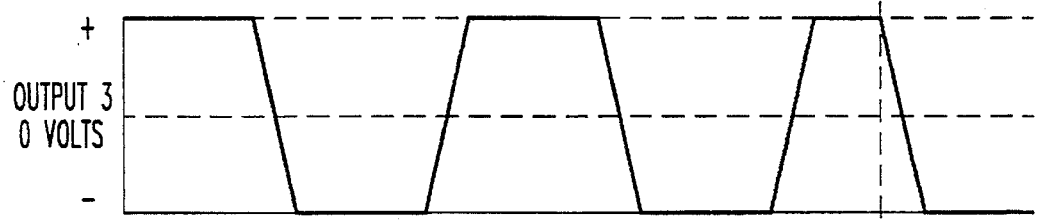
Figure 2D:
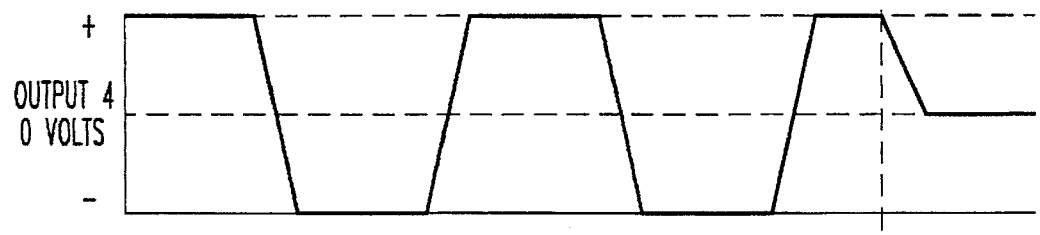
Figure 2E:
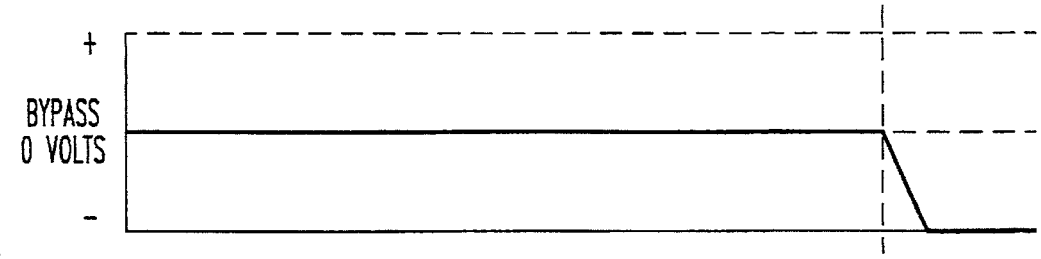

Commercial AC voltage is applied to a plurality of rectifiers 101 to 102, via an input lead 103. The rectifiers are connected in parallel to float a battery 105 and to be applied to a plurality of battery polarity switching circuits 111, 112, 113 and 114. Each of the battery polarity switching circuits 111 to 114 is connected to an independent load, connected to the output leads 121, 122, 123 and 124, respectively. In the exemplary embodiment the connection to the load is by a co-axial cable. Each individual load is capable of being energized by a DC voltage or a low frequency AC voltage (e.g., 1 Hz to 60 Hz). The individual battery polarity switching circuits 111 to 114 are not galvanically isolated from one another and hence it is necessary to operate these circuits in switching synchronism with one another. Synchronism control is included within each of the BPS circuits and techniques are known, by those skilled in the art, how to implement this function and hence it is not discussed in detail herein. Each BPS circuit is required to have the ability to stop switching to invert the DC voltage and to directly transmit a DC voltage from the DC voltage source to the load as a DC voltage. A negative DC voltage is chosen in the illustrative example for application to the load in order to minimize corrosion of the outer coaxial sheath of the coaxial power distribution system.

The output of each of the battery polarity switching circuits 111 to 114 is continuously monitored by a DC bypass control circuit 115, via lead 133. Failure of the output of any of these circuits is responded to by the closure of the switch 131 included in the bypass control circuit 115 and causing all of the BPS circuits to supply DC voltage to the co-axial cable connecting it to the load. The bypass control circuit 115 includes a diode switch array 139 for enabling application of reserve DC power, via leads 141 through 144, to the output of any of the battery polarity switching circuits 111 through 114, that have failed. Operative battery polarity switching circuits conduct DC voltage from the rectifier to the switching circuit outputs to enable energization of the associated loads by a DC voltage.

The rectifiers 101 to 102 are connected to charge a battery 105 which may provide a reserve DC voltage if needed. The DC voltage supplied by the rectifiers (101, 102) is connected to the battery terminal DC voltage, and so long as the input AC voltage is at normal magnitude, voltage is supplied from the rectifiers rather than the battery 105.

The output of each of the battery polarity switching circuits 111 to 114 is monitored by the DC bypass control 115, via lead 133, which detects a failure at any of the outputs. Upon such detection of a failure of output voltage which may reflect a synchronization failure or a failure of one or more of the battery polarity switching circuits 111 to 114, the BPS are signaled to go to the DC voltage mode of operation and the DC bypass control closes the switch 131 which allows direct application of a DC voltage to an output of one or more of the battery polarity switching circuits 111 to 114. The diodes of the diode switch array 139 in the path to each output are enabled or biased conducting in any one path or more connected to any output where the magnitude of the DC voltage is below the DC voltage level supplied by the DC bypass control 115.

The operation of the system may be readily ascertained by reference to the illustrative waveforms of FIGS. 2A–2E. As shown each of the four battery polarity switching circuits 111 to 114 provides a bipolar trapezoidal waveform at a low frequency (one Hertz in the illustrative example). At a certain illustrative time, the output 4 of the unit 114 is shown to have failed. Upon the occurrence of this failure all of the battery polarity switching circuits 111 to 114 are disabled from the switching and creation of a low frequency bipolar periodic trapezoidal waveform from the input DC voltage and are adjusted to provide a negative DC voltage to each of the output leads. Since they are still capable of functioning, switching units 111 to 113 provide the negative DC voltage from the output of the rectifiers. The failed switching unit 114 is positively disabled from functioning and a negative DC voltage is provided through the diode switch array 139 as the bypass negative DC voltage. The bypass negative DC voltage is lower in magnitude than the negative DC voltage supplied through the units 111 to 113 from the rectifiers and hence the reserve negative voltage supplied through the dime array is only provided at the output 124 of the failed switching unit 114. As is apparent from the illustrative voltage waveforms shown the provision of the negative DC voltage in response to a failure is almost instantaneous. In the exemplary embodiment the voltage applied to the co-axial distribution is negative with the inner conductor voltage of the co-axial system being negative with respect to the outer sheath.

Figure 3:
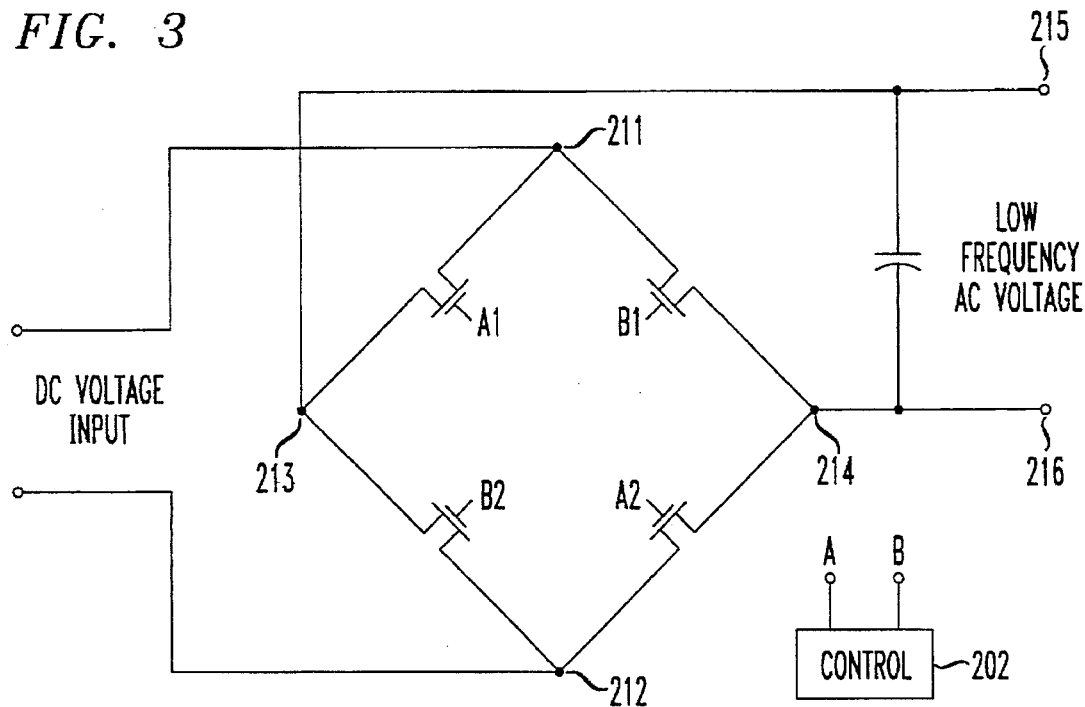
FIG. 3 is a block schematic of a low frequency inverter used in the power system.

An illustrative battery polarity switch as shown in FIG. 3 comprises four controlled switching devices a1, a2, b1 and b2 connected in a bridge having two terminals 211 and 212 connected to receive a DC input voltage and two terminals 213 and 214 connected to supply a low frequency or DC voltage across output terminals 215 and 216. The switching devices a1, a2, b1 and b2 are controlled by the control circuit 202. During normal operation the switches a1, a2 and b1, b2 are enabled in the alternative to generate the low frequency AC voltage. In the case of a failure of another unit the unit switches are configured to provide a negative DC voltage to the output 215 which may be accomplished by the continuous enablement of switches b1 and b2.

Figure 4A:
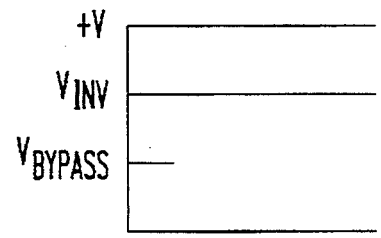
FIG. 4 is a block schematic of a DC bypass voltage switch for coupling the load to primary and reserve sources of power.
Figure 4B:
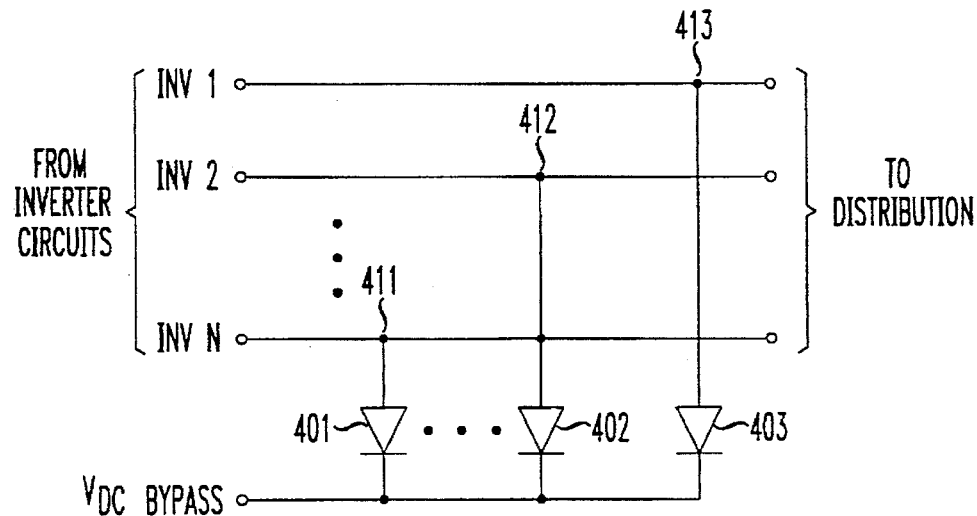

The diode array, for a plurality of outputs, is shown in the FIG. 4 and as shown shows three diodes 401, 402 and 403, as part of a plurality of dimes. Each individual dime has its cathode connected to a source of negative DC bypass voltage at lead 401 and has the anodes connected to the leads 411, 412 and 413, respectively. It is readily apparent that the dimes conduct only to output leads of a failed BPS since only a dime to that particular lead is forward biased.

The invention claimed is:

1. A power plant system for providing redundant power through a co-axial cable connected to a DC/AC load; comprising:

a plurality of voltage polarity switching circuits for inverting an input DC voltage to a low frequency AC voltage to be delivered to the load;

each switching circuit being synchronized to other of the switching circuits, upon failure of a switching circuit or failure of synchronization between the switching circuits, each remaining operative switching circuit adapted to transmit a DC voltage to the load; and DC bypass circuitry for monitoring voltage outputs of the voltage switching circuits and including gating circuitry for applying a reserve DC voltage to individual outputs of each of the switching circuits, the reserve DC voltage being slightly less in magnitude than the primary DC voltage by at least the voltage drop of the gating circuit.

2. A power plant system for providing redundant power to a co-axial cable, as claimed in claim 1; wherein:

the gating circuitry comprises a diode array having the diode inputs connected to a common node connected to the reserve DC voltage and the diode outputs each individually connected to a different switching circuit output.

3. A power plant system for providing redundant power to a co-axial cable, as claimed in claim 1; wherein:

switches of the switching circuit may be operated to invert a DC voltage into an AC voltage and in the alternative operated to provide a through coupled DC voltage at the output of the switching circuit.

4. A power plant system for providing redundant power to a co-axial cable, as claimed in claim 3; wherein:

the through coupled DC voltage being a negative voltage with the inner conductor of the co-axial cable being negative to the outer sheath of the co-axial cable.

5. A power plant system for providing redundant power to a co-axial cable, as claimed in claim 1; wherein:

the switching circuit includes four switching devices connected in a bridge array.

6. A power system for energizing a low frequency load at substantially 1 Hz, comprising:

an input for accepting and rectifying an AC source of voltage;

a source of reserve voltage including a DC voltage source and connected to be charged;

a low frequency inverter circuit connected to receive DC voltage from the input for accepting and rectifying and an output connected to supply low frequency voltage to a coaxial distribution system;

control circuitry to monitor and select inverter circuits in a failed condition; and a DC bypass switch connected to couple the DC voltage source to an output of selected low frequency inverter circuits in order to supply a DC voltage to the coaxial distribution system;

the DC bypass switch including a diode forward biased by an occurrence of an abnormally low voltage at an inverter output and connecting the DC voltage source to the coaxial distribution system.

7. A power system for energizing a low frequency) load at substantially 1 Hz, as claimed in claim 6, comprising:

the low frequency inverter circuit including first, second, third and fourth power switching devices connected in a bridge configuration;

the control circuitry enabling the first and third and second and fourth switches in alternating time intervals of normal voltage inversion from DC voltage to AC voltage; and the control circuitry enabling the first and second switching device continuously conducting for intervals of supplying redundant DC voltage from input to output during failures of system components.

8. A power system for energizing a low frequency load at substantially 1 Hz, as claimed in claim 6, comprising:

the DC bypass switch including a plurality of diodes with each diode connected to the output of a different low frequency inverter circuit.

9. A power system for energizing a low frequency load at substantially 1 Hz, as claimed in claim 6, comprising:

the voltage applied to the co-axial distribution being negative with an inner conductor voltage of the co-axial system being negative with respect to the outer sheath.

10. A power system for energizing a low frequency load at substantially 1 Hz, as claimed in claim 6, comprising:

a voltage drop in the DC bypass switch applies a redundant voltage to the output of the low frequency inverters at a magnitude less than level of the rectified AC voltage so that the redundant voltage is only transmitted by the diode to a failed low frequency inverter.

* * * * *